(12) United States Patent
Vieslet

(10) Patent No.: US 11,787,091 B2
(45) Date of Patent: Oct. 17, 2023

(54) THERMOPLASTIC MAT, PROCESS FOR THE MANUFACTURE THEREOF AND USES OF SAME

(71) Applicants: CRISTALUX INTERNATIONAL SÀRL, Luxembourg (LU); Jean-Paul Vieslet, Liège (BE)

(72) Inventor: Jean-Paul Vieslet, Liège (BE)

(*) Notice: Subject to any disclaimer, the term of this patent is extended or adjusted under 35 U.S.C. 154(b) by 428 days.

(21) Appl. No.: 16/977,033

(22) PCT Filed: Feb. 27, 2019

(86) PCT No.: PCT/EP2019/054827
§ 371 (c)(1),
(2) Date: Aug. 31, 2020

(87) PCT Pub. No.: WO2019/166474
PCT Pub. Date: Sep. 6, 2019

(65) Prior Publication Data
US 2021/0039287 A1    Feb. 11, 2021

(30) Foreign Application Priority Data

Mar. 1, 2018   (LU) .......................... 100718

(51) Int. Cl.
*B29C 43/52*   (2006.01)
*B29C 43/26*   (2006.01)
(Continued)

(52) U.S. Cl.
CPC .............. *B29C 43/52* (2013.01); *B29C 43/26* (2013.01); *B29C 2043/525* (2013.01);
(Continued)

(58) Field of Classification Search
CPC ............ B29C 43/006; B29C 2043/522; B29C 2043/525; B29C 43/52; B29C 43/26;
(Continued)

(56) References Cited

U.S. PATENT DOCUMENTS 3,827,213 A * 8/1974 Matzinger ............... B65B 63/08
                                                          53/370.4
4,199,635 A * 4/1980 Parker ....................... B32B 5/26
                                                          442/388
(Continued)

FOREIGN PATENT DOCUMENTS

DE    4117797 A1    12/1992
EP    1754585      *  2/2007
(Continued)

*Primary Examiner* — Jeffrey M Wollschlager
(74) *Attorney, Agent, or Firm* — Harness, Dickey & Pierce, P.L.C.

(57) ABSTRACT

The present invention relates to a stable mat (10) based on thermoplastic materials, comprising a core of compacted plastics (14), the cohesion of which is provided by spot thermal fusion (18) in the core of the mass, and a skin obtained by surface thermal fusion and/or a thermoplastic shell (12) firmly attached to the core by localized thermal fusion. Such a mat may serve as bases for civil engineering constructions, for the distribution of loads in the case of loose, unstable, or marshy soils, the stabilization of embankments or of unstable soils, earthquake-resistant protection of foundations of structures and composition of absorbent ballasts of railroads. They may also be used for the manufacture of prefabricated road elements.

8 Claims, 2 Drawing Sheets

(51) Int. Cl.
 *B29K 105/26* (2006.01)
 *B29L 7/00* (2006.01)
 *B29L 31/10* (2006.01)
(52) U.S. Cl.
 CPC ..... *B29K 2105/26* (2013.01); *B29L 2007/002* (2013.01); *B29L 2031/10* (2013.01)
(58) Field of Classification Search
 CPC . B29C 43/28; B29B 17/0026; B29B 17/0036; B29K 2105/26; B29L 2007/002; B29L 2031/10
 See application file for complete search history.

(56) References Cited

U.S. PATENT DOCUMENTS

| | | | | |
|---|---|---|---|---|
| 5,258,085 | A * | 11/1993 | Breitscheidel | B29C 66/727 264/109 |
| 5,283,026 | A * | 2/1994 | Okumura | B29C 35/04 264/234 |
| 5,411,697 | A * | 5/1995 | McGraw | B30B 9/3007 428/903.3 |
| 5,587,120 | A * | 12/1996 | Vieslet | B29C 43/02 264/118 |
| 5,744,763 | A * | 4/1998 | Iwasa | G10K 11/165 181/290 |
| 6,500,373 | B1 * | 12/2002 | Konishi | B29B 17/0412 264/913 |
| 2008/0241455 | A1 * | 10/2008 | DiNello | B32B 3/26 428/58 |
| 2010/0145005 | A1 * | 6/2010 | Hitzler | B29B 17/0026 528/502 C |

FOREIGN PATENT DOCUMENTS

| | | | |
|---|---|---|---|
| JP | 03090337 | * | 4/1991 |
| JP | H0390337 A | | 4/1991 |
| WO | WO 9421435 A1 | | 9/1994 |
| WO | WO 2019/166474 A1 | | 9/2019 |

* cited by examiner

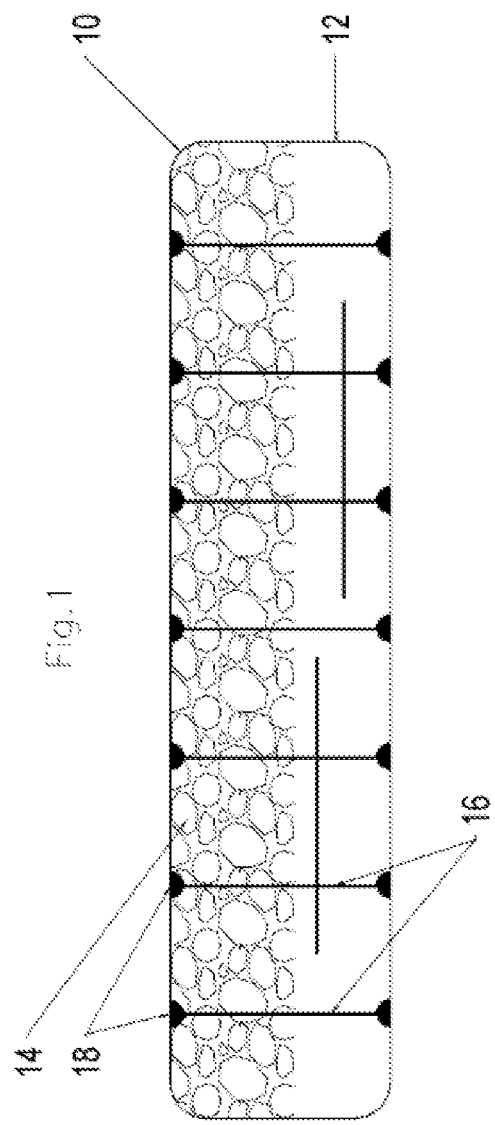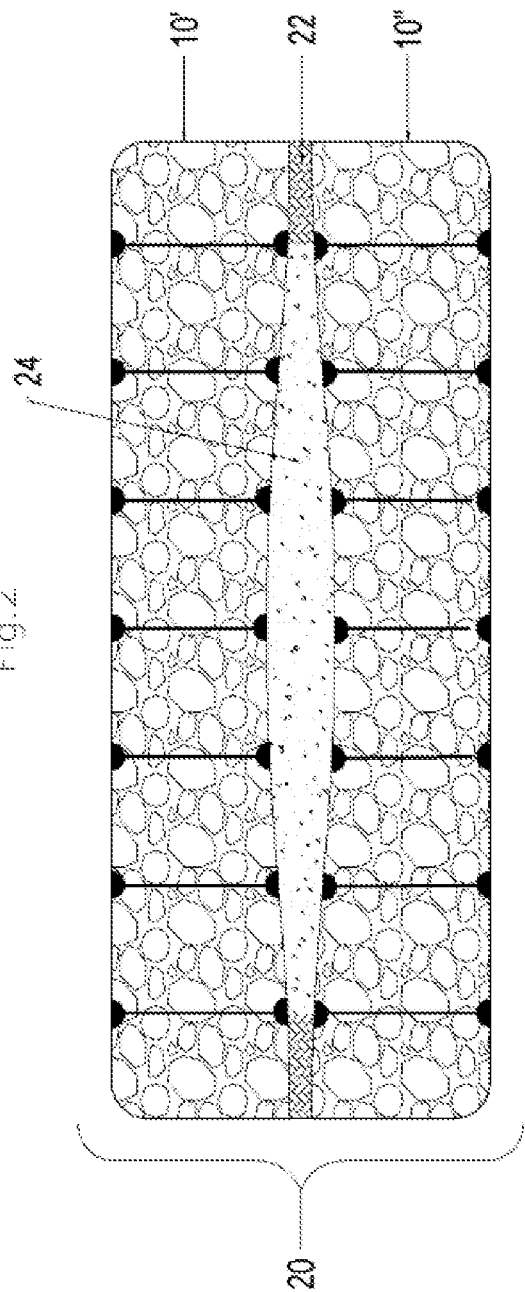

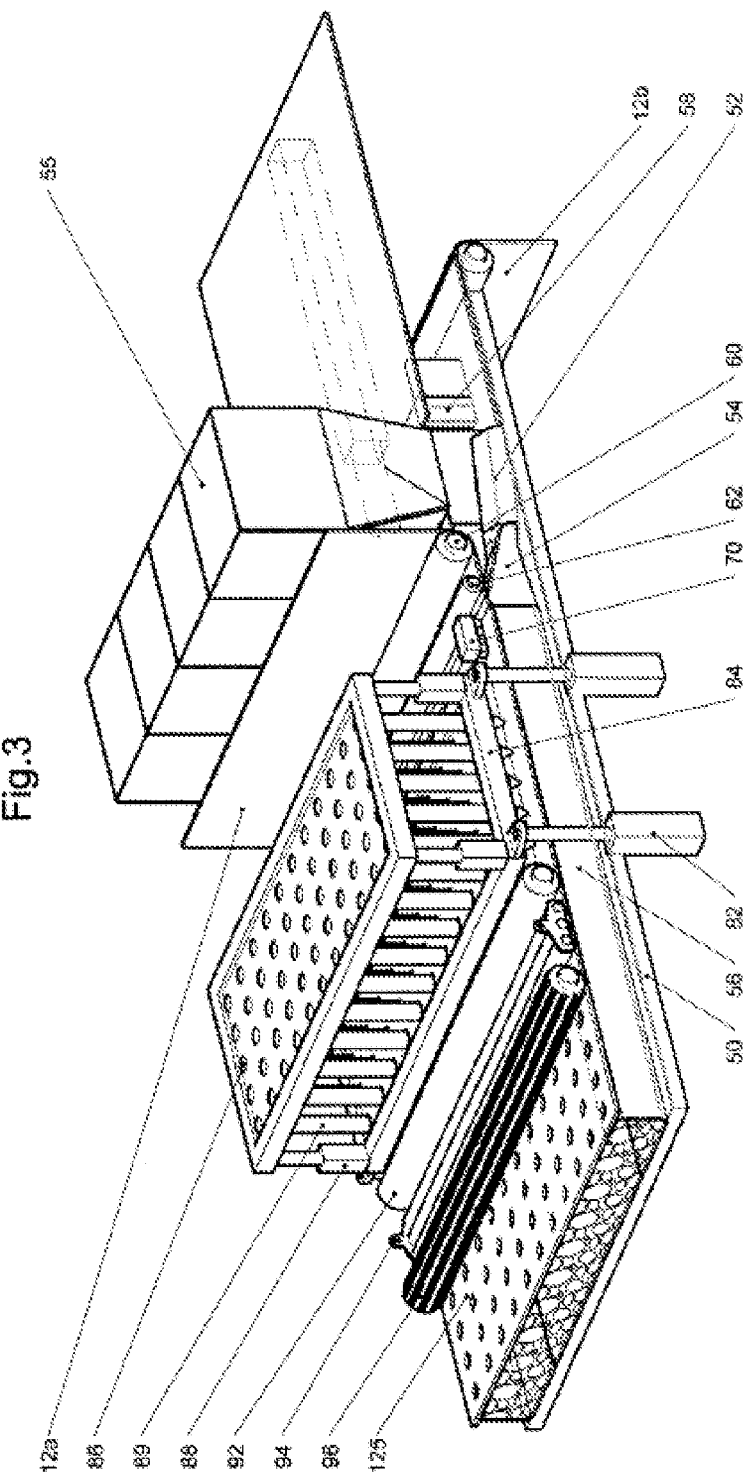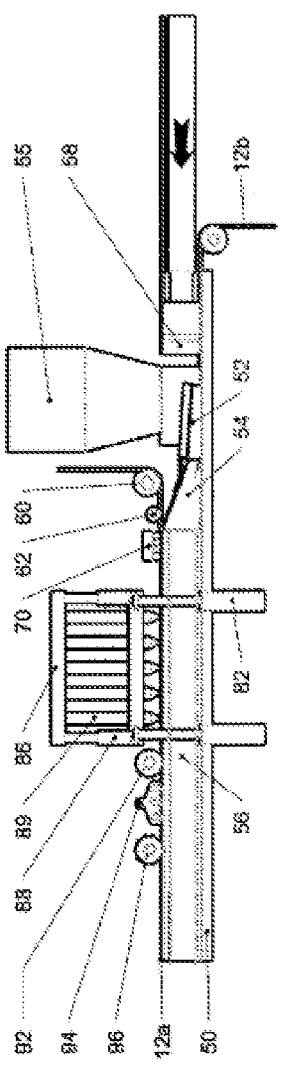

THERMOPLASTIC MAT, PROCESS FOR THE MANUFACTURE THEREOF AND USES OF SAME

CROSS-REFERENCE TO RELATED APPLICATIONS

This application is a U.S. National Stage of International Application No. PCT/EP2019/054827, filed on Feb. 27, 2019, which claims the benefit of, and priority to, Luxembourg Patent Application No. 100718, filed on Mar. 1, 2018. The entire disclosures of the above applications are incorporated herein by reference.

The present invention relates to a mat made of plastics material, in particular recycled, reject or scrap, which can be used as it is or can be cut and/or worked and/or assembled in blocks, or a single-layer or multilayer mat having a controlled rigidity, of any desired dimensions. It further relates to a method, in particular a continuous method, for manufacturing a mat of this kind, as well as uses thereof.

The accumulation of plastics waste is constantly increasing, and pollution, in particular of the oceans, is of such a scale that we talk about a seventh continent. Fragments of plastics material are regularly found in the stomachs of fish and cetaceans. Even if the selective collection of household waste prevents dumping of plastics materials, it also generates ever more significant storage of plastics materials if they are not used as a fuel in incinerators. It is well known that incinerating such waste poses huge problems at the level of control of atmospheric pollution and of production of fly ash.

WO94/21435 describes a method for manufacturing blocks having stable dimensions, from fragments of thermoplastic materials, and in particular recycled materials, such as scrap resulting from industrial processes, or waste, sorted or otherwise, from the consumer market. According to this document, a mixture of polymers is compressed, stressed under loading in a specified volume, and the compressed volume is pierced by heated needles at a temperature greater than the softening point of at least one of the polymers contained in the mixture, so as to achieve a material cohesion under stress, forming said block. Thus, blocks of plastics material are obtained which are kept under regulatable pressure, depending on the desired uses, by means of internal welding. Said blocks are used as anti-noise panels and in civil engineering, in particular in work such as lightening soil, drainage, foundation and substrate support for work and construction on unstable ground. However, the method described in WO94/21435 is not a continuous method and, moreover, it is suitable only for thermofusible plastics materials, even if the inclusion of very small quantities of small fragments of other materials, such as wood or metal pieces, can be tolerated, as long as the sinking of the heated needles is not impeded. It is noted that the inclusion of materials that are not thermofusible disrupts the cohesion of the blocks and thus affects their resistance. Said technique is well suited in particular to semi-rigid plastic waste, such as bottles, flasks, and the like.

DE-4117797 describes a method for manufacturing construction panels from thermoplastic waste without energy-consuming fusion of said plastics materials. The thermoplastic waste is crushed and connected, in an overlapping manner, by spot fusion using heated needles, in order to form a panel. The surface of the panel may be smoothed or sealed by applying an additional layer of a suspension of hydraulically hardenable fly ash, with or without supplementary cement. In order to achieve this, it is possible to use an additional layer of foaming materials, such as a polyurethane foam. Said smoothing can be carried out by means of brief thermal surface treatment. It is also intended for a sheet or a woven fabric to be applied to one surface, which sheet or woven fabric may be fixed in a pointwise manner. Here, the connection, by spot fusion using heated needles, between two stacked panels, is described. As in the situation above, the method is not continuous and is not suitable for all plastics materials, even if some inclusion of impurities may be tolerated. Finally, it would appear that said method has, to date, never been put into practice in industry.

An object of the present invention consists in providing a mat made of plastics materials, based on thermoplastic materials, in particular from recycling, discards and/or scrap, which can nonetheless comprise some quantity of non-fusible plastics materials, such as thermosetting plastics or cellulosic materials, for example. The thermoplastic materials may be salvaged thermoplastic materials, worn or not, originating from production scrap from industrial processes, waste, discards or scrap, or waste, sorted or otherwise, from the consumer market.

Another object consists in providing a mat of this kind, the rigidity of which can be controlled or adapted depending on the use and the material used.

Another object of the present invention aims at providing a continuous manufacturing method of such mats made of thermoplastic material, whatever their shape or their size.

The invention also relates to various uses of the mat of the invention.

According to a first aspect, the invention relates to a stable mat made of plastics material, based on a mixture of thermoplastic materials, in particular salvaged thermoplastic materials, comprising a core made of compacted plastics materials, the cohesion of which is ensured by internal spot thermofusion, and a skin resulting from thermofusion that is continuous or perforated on the surface, and/or a thermoplastic casing that is rigidly connected to the core by means of spot thermofusion.

Advantageously, the core of the mat of the invention comprises salvaged and/or waste materials, more particularly scrap materials resulting from industrial processes and/or waste, sorted or otherwise, originating from the consumer market, and/or plastics materials recovered from the "seventh continent." The thermofusible materials and other materials may alternate.

The core may consist in various materials, optionally mixed and even relatively dirty. These may be materials which would be incompatible in other methods.

The mat of the invention can be used as such, as described below, or can be cut into stable plates or blocks of smaller dimensions, depending on the applications sought.

The mat of the invention makes it possible to include non-thermoplastic materials, such as thermosetting plastics. According to the intended applications, it may comprise up to 95% by weight of non-thermoplastic materials, or up to 80% by weight or 70% by weight of non-thermoplastic materials, advantageously up to 60% by weight, or 50% by weight. According to other applications requiring greater cohesion, it may comprise up to 40% by weight, or up to 30% by weight, preferably up to 25% by weight of said materials, in particular approximately 15% by weight of non-thermoplastic materials, without the cohesion of the core being significantly affected. The skin resulting from surface thermofusion and/or the casing that is rigidly connected to the core of compacted thermoplastic materials makes it possible to keep in place the fragments of non-thermoplastic materials which are therefore not welded to the adjacent materials of the core of the mat but are crushed between other fragments of plastics materials, and thus contribute to the stability of the block of the invention.

The skin consists in surface thermofusion, either continuous or perforated, for example in the form of a trellis or grid, or a perforated plate, of thermofusible plastics materials located on the surfaces of the mat. It is thus possible to submerge a framework in the skin during formation thereof by means of thermofusion. The skin, once rigidified, contributes to the cohesion of the mat, while preventing the loss of non-fusible particles.

The casing consists of a thermoplastic sheet which may be reinforced, in particular by means of a framework such as natural fibers (for example cotton), synthetic fibers (for example polyester) or mineral fibers (for example glass fibers), either woven or non-woven. The selection of the casing depends on the intended use. In the case of a use in which the mat is subjected to only small loads, it is possible to provide a less resistant casing than in uses in which the mat is subjected to significant stresses, in particular together with high load distribution. In this latter case, it is preferable to use a reinforced casing.

It is also possible to provide a casing made of heat-shrinkable plastics material. This is intended to contribute to the cohesion of the mat, in association with the heat sealing, and to prevent the loss of non-thermofusible particles or elements. It is arranged so as to contribute to definitive and dimensionally precise aesthetic characteristics.

It is also possible to provide, as a casing, complex laminated films, optionally reinforced by woven or non-woven fabrics that are known per se.

According to a variant, it is also possible to provide, as the casing, an essentially continuous or perforated film formed by superficial thermofusion of at least one of the surfaces of the mat obtained. Said thermofusion can be achieved by means of heated plates, optionally perforated, or by trellis or grids made of heated wire which soften, and solder, on the outside surface of the mat, the thermofusible particles positioned on the surface of said mat. In the case of a trellis or grid, for example, it is possible to provide heated wires in register with the spots or channels of spot internal thermofusion.

According to another embodiment of the invention, it is possible to provide a mat formed of at least two of the above-mentioned mats stacked on top of one another and interconnected by means of bonding, including heat-sealing or bonding by means of a suitable bond on the basis of thermosetting or thermoplastic foam, or by means of spot thermofusion. It can be easily understood that, in this case, the skin and/or the thermoplastic casing plays an essential role in the assembly of the layers.

In this case, it is also possible to provide for the inclusion of fragments of non-thermoplastic material between the layers. Said materials are then held in place by bonding or welding of the skins or casings of two stacked layers. This offers a possibility of use for such materials, which are currently at risk of being dumped or used as a fuel in incinerators.

Within the context of the present description "spot thermofusion" means a localized application of energy so as to bring the thermoplastic material locally to a temperature greater than the softening point thereof, so as to bond or weld it to an adjacent fragment of material. Of course, a rigid connection or welding between materials takes place only between molten thermoplastic materials.

According to the invention, the internal spot thermofusion can be achieved by sinking into the mass needles that have been brought to a temperature greater than the softening point of at least one of the thermoplastic materials present. Advantageously, the temperature of the needles is greater than the softening point of all the thermofusible materials present. According to a preferred embodiment, the temperature of the fusion needles is at least 10° C., more particularly at least 20° C., preferably at least 30 to 40° C., greater than the softening point of the thermofusible material present that has the highest softening point.

According to another aspect, the present invention also relates to a continuous method for manufacturing mats as described above. According to a first embodiment of the method of the invention, a mixture comprising fragments of thermoplastic materials is deposited and distributed on a belt conveyor or a work surface, the bed of material is passed under a press which compresses the bed of material to a desired density, internal spot thermofusion is carried out, and a skin is optionally formed by surface thermofusion, and the compression is maintained until the mat has cooled at least in part.

The skin obtained by surface thermofusion may consist of an essentially continuous or perforated skin. In the latter case, said skin essentially takes the form of a trellis or grid, in particular in register with the internal spot thermofusion. Of course, a skin is advantageously formed on at least four surfaces of the mat, in particular the upper and lower surfaces and the lateral surfaces connecting them.

The skin can also comprise a framework, in particular made of textile fibers, more particularly synthetic or mineral fibers, embedded in the molten material.

The skin may be formed before, but preferably during or after, the internal spot thermofusion.

According to a variant of the method of the invention, a lower thermoplastic sheet is deposited on a suitable belt conveyor, the lower thermoplastic sheet is straightened from each side of the belt conveyor, on lateral walls, in order to form two covering edges, a mixture comprising fragments of thermoplastic materials is deposited and distributed on the lower thermoplastic sheet, an upper thermoplastic sheet is deposited on the bed of material, the bed of material is passed under a press which compresses the bed of material to a desired density, internal spot thermofusion is carried out, and the compression is maintained until the mat has cooled at least in part.

According to a preferred embodiment, the internal spot thermofusion consists in penetrating into the compressed bed of material needles that have been heated to a temperature greater than the softening point of at least one of the thermoplastic materials present.

According to an advantageous embodiment, the press consists of a lower support surface, optionally substantially vertical lateral guides, and an upper compression surface. Advantageously, the compression surface is formed by a perforated base that is arranged so as to be crossed by heated needles, said perforated base being vertically displaceable in one direction in order to compress a material mat, and in the opposite direction to release the pressure. Said perforated base can be displaced using one or more jacks, preferably hydraulic or pneumatic.

Preferably, the compression surface is the base of a parallelepipedal cage which comprises the perforated base, a support base opposite said perforated base and connected thereto by telescopic spacers, preferably jacks, the support base serving as a support for a plurality of heated needles that are arranged so as to be substantially perpendicular. When the support base approaches the perforated base, said perforated base is penetrated by the heated needles, and the heated needles penetrate into the plastics material mat.

According to a particularly preferred embodiment, it is possible for the support surface of the press to be perforated so as to allow for heated needles to pass through. In this case, the heated needles can cross the bed of material and the casing sheet without colliding with the support surface. It is, however, also possible to provide lower heated needles, actuated under the transport surface of the material mat. It is thus possible to carry out thermofusion from above and/or from below.

Of course, other embodiments are possible, according to which internal spot thermofusion is, furthermore, carried out laterally.

Preferably, the sheets of thermoplastic material are unwound on the belt conveyor and/or on the compressed material mat.

The temperature of the needles is advantageously selected according to the teaching above relating to the spot thermofusion.

According to a particularly preferred embodiment, the covering edges are folded onto the upper thermoplastic sheet before needles heated to a temperature greater than the softening point of at least one of the thermoplastic materials present penetrate into the compacted and compressed bed of material.

When attempting to create a skin, the shaping surfaces, in particular the support surface, the compression surface, and preferably also the lateral surfaces, are heated.

When attempting to achieve a skin equipped with reinforcement, the thermoplastic sheet can be replaced, in the method above, by a woven fabric, for example.

In this way, a stable mat made of compressed plastics materials and enveloped in a thermofusible "skin" is obtained, a mat of which the internal cohesion is largely ensured by internal spot thermofusion or heat sealing, for various applications as described by way of example in the following.

As already explained above, the method advantageously makes use of salvaged and/or waste materials, more particularly scrap materials resulting from industrial processes and/or waste, sorted or otherwise, originating from the consumer market, and/or plastics materials recovered from the "seventh continent." In order to ensure the most constant possible quality of the product, it is advantageous to provide a step of weighing and/or metering of raw materials and/or homogenization of the mixture. The thermoplastic materials may be compacted to a temperature between ambient temperature and 1000° C., preferably between 20° C. and 30° C.

The method comprises introducing, into the mass, needles that have been brought to a temperature greater than the softening temperature of at least some of the thermoplastic materials present. Said needles create channels through the mat mass, channels of which the walls are at least partially, preferably mainly, formed by thermoplastic materials that are welded together. As a result, cohesion of the material fragments by means of internal spot thermofusion or heat sealing is achieved. Said channels thus formed ensure resistance to compression and internal resilient cohesion of the mat. It is thus possible to form a product of which the modulus of elasticity is perfectly controlled, by making use of the stressing of the mass of the mat during the method, while making use of the thickness of the channels ensuring internal welding of the materials.

The method does not require any particular preparation of the raw material. As already mentioned, it is possible to use scrap plastics materials, even when dirty and unwashed. It is likewise not necessary to formulate or reformulate a salvaged mixture. Indeed, the mixture of thermoplastic materials may comprise up to 40% by weight of fragments of non-thermoplastic material, advantageously up to 30% by weight, preferably up to 25% by weight and more particularly approximately 15% by weight of non-thermoplastic materials. These are essentially thermosetting plastics materials, although small wood or metal impurities can be tolerated. Of course, the non-thermoplastic fragments must remain within acceptable dimensional limits.

In some applications, in particular in agriculture, it is possible to include organic materials, such as natural fibers that may be soaked in or saturated with fertilizer or other materials that promote the growth of plants, such as biochar (charcoal for agricultural use).

It is clear to a person skilled in the art that the distance between heated needles is set depending on the average dimension of the particles and depending on the application sought, or rather the desired mechanical resistance. If each thermofusible particle is "caught" by a heated needle, significant cohesion between the particles of the mat is achieved. If the heated needles are brought closer again, the increase in cohesion and rigidity is probably no longer in relation with the energy outlay required. As the distance between heated needles is increased and/or non-fusible materials are included, the cohesion reduces. A person skilled in the art would adapt the particle dimensions and the distance between the heated needles to the mechanical requirements and corresponding applications. By way of example, it is possible to provide 10-12 heated needles per meter for thermofusible particle dimensions of approximately 7-8 cm, for civil engineering applications requiring significant load distribution.

It will be understood that the casing, i.e. a thermoplastic sheet that is rigidly connected to the core of the mat by means of needling and/or the surface thermofusion skin, also contributes to the cohesion and to the dimensional characteristics thereof. Furthermore, it also ensures that non-thermoplastic materials are retained in the core of the mat, which materials, by nature, are not welded into the mass and which, without the presence of the casing, would have a tendency to escape from the mat.

The size of the needles would be adapted to the thickness of the mat and to the size of the particles. By way of example, it is possible to provide needles having a diameter of from 1 to 10 cm, preferably from 1.5 to 5 cm. By way of example, for particles of 7-10 cm, needles of approximately 30 mm in diameter are entirely suitable.

According to an advantageous embodiment, it is possible to provide dimensions of needles so as to form channels through the mat material which allow for fixing or clamping means to pass through, in particular fixing, assembly or compression cables, or pouring of reinforcing concrete.

In a similar manner, the number of needles is adjusted depending on the intended application. By way of example, for a civil engineering application, in particular the stabilization of the ground below a railway line, approximately 95 needles of 30 mm are provided per $m^2$.

The mat of the invention can function as a base for roads, pavements, or prefabricated buildings. It is possible to pour, onto a base consisting of one or more mats of the invention, a concrete slab, preferably reinforced, thus forming a road, a cycle track or a pavement, or prefabricated elements of a road, pavement, or cycle track. In this case, the channels formed by the heated needles constitute good anchoring points for the concrete slab.

The mat of the invention, or blocks cut therein, can also act as a plant growth substrate or a base for arable ground, in particular in desert regions. In this case, it is advantageous to perforate the upper casing. It thus allows for plants to penetrate, by way of their root system, into the core of the mat, which may be provided with organic materials such as organic substrates or fibers and/or nutriments, and/or runoff water may run therethrough. During manufacture of mats intended for this application, it is possible to adjust the number of isolated instances of heat sealing per unit of surface area, so as to promote the supply of water and nutriments.

Other applications in the field of civil engineering consist in using the mat of the invention, or blocks cut therein, for distributing loads in the case of loose, unstable or marshy land, for stabilizing embankments or unstable ground, earthquake-resistant protection of structural foundations, and for forming absorbent ballasts for railways.

Finally, the mat or elements cut therein can be used for manufacturing heat- and/or sound-insulating panels. The mat is made up of materials having a reduced thermal conductivity, and trap air in reduced spaces. It is therefore an excellent heat insulator. Furthermore, this material structure comprising, alternately along a line crossing the mat of the invention, spaces filled with air and semi-rigid materials, is particularly suitable for absorption of sound vibrations and thus as an acoustic insulator. Of course, in this type of application it is possible to increase the inclusion of non-thermoplastic materials and/or to reduce the mechanical resistance of the casing, given that the stresses to which said panels are subjected are relatively limited.

The present invention is described in greater detail in the following, with reference to drawings, in which:

FIG. 1 is a cross section through a mat according to the invention;

FIG. 2 is a cross section of a particular embodiment of a mat according to the invention;

FIG. 3 is a cross section elevation view of a manufacturing installation of a mat according to the invention; and FIG. 4 is a lateral view of the installation of FIG. 3.

The cross section of FIG. 1 shows a mat 10 comprising a thermoplastic casing 12 and a core made of compressed plastics materials 14. Said plastics materials consist of a mixture of thermoplastic materials and other materials, including thermosetting plastics materials, as described above. The cohesion of the core is ensured by internal spot thermofusion, shown in the figure by vertical trajectories 16. The thermoplastic casing 12 is advantageously rigidly connected to the core by means of thermofusion or welding, shown by the fusion needles 18.

As mentioned above, the core comprises salvaged and/or waste plastics materials, such as scrap materials resulting from industrial processes and/or waste, sorted or otherwise, originating from the consumer market, and/or materials recovered from the seventh continent. Of course, it is the thermoplastic materials which ensure, at least in part, the cohesion of the mat by means of thermofusion. It is nonetheless possible to provide up to 95, 80 or 70% by weight, preferably up to 60% by weight, more particularly up to 50% by weight, of non-thermofusible materials, such as in particular thermosetting plastics, or up to 40% by weight, preferably up to 30% by weight, more particularly up to 25% by weight, for example approximately 15% by weight of said materials, depending on the intended applications.

The compression, and the interweaving of the various pieces resulting therefrom, also promotes the cohesion of the core 14. Furthermore, the casing 12 which encloses the materials as in a skin, reinforces or further consolidates the assembly, preventing the loss of non-thermofusible materials.

The materials forming the core 14 of the mat 10 of the invention advantageously consist in salvaged and/or waste plastics materials, more particularly scrap materials resulting from industrial processes and/or waste, sorted or otherwise, originating from the consumer market, and/or plastics materials recovered from the "seventh continent." The thermofusible materials and other materials may alternate.

The casing 12 consists of a thermoplastic sheet which, depending on the intended applications, may be reinforced, in particular by means of a framework such as natural fibers (for example cotton), synthetic fibers (for example polyester) or mineral fibers (for example glass fibers). A person skilled in the art will adjust the selection of the casing sheet to the intended applications.

According to an embodiment shown in FIG. 2, it is possible to provide a mat 20 formed of at least two of the above-mentioned mats 10' and 10" stacked on top of one another and interconnected by means of bonding, including heat-sealing or bonding for the purpose of a sufficient bond on the basis of thermosetting or thermoplastic foam, or by means of spot thermofusion 22. It can be easily understood that, in this case, the thermoplastic casing plays an essential role in the assembly of the layers. In this case, it is also possible to provide for the inclusion of fragments of material, in particular fragments of non-thermoplastic material 24, between the layers or mats. Said materials are then held in place by bonding or welding of the casings of two stacked mats.

FIGS. 3 and 4 schematically show an installation for continuous manufacture of a mat according to the invention. The installation comprises a frame (not shown) which is equipped with a work surface, for example a fixed work surface equipped with chains or other means of longitudinal transport, or a belt conveyor on which a sheet of thermofusible casing 12a can be unrolled. During the advancement movement of the casing sheet 12a, the two lateral ends thereof are folded upwards, in a straightening guide 52 arranged on either side of the belt conveyor. In the location of the straightening guides 52, a hopper 55 is arranged above the belt conveyor or the work surface. Said hopper makes it possible to change and distribute, on the casing sheet 12a, the plastics materials which will make up the core 14 of the mat of the invention. The hopper 55 can be compartmentalized such that it is possible to load different materials or mixtures of materials, depending on the width of the mat. A compression means 58 is provided upstream of the hopper in order to compress the materials in the longitudinal direction, to avoid spreading the plastics materials, and to ensure preliminary shaping of the mat to be shaped and rigidified. Downstream of the hopper an applicator 60 of a top casing sheet 12b is arranged. The applicator 60 may consist in a deflection roller for the casing sheet 12b which advantageously serves, at the same time, as a compression roller for the plastics material deposited by the hopper on the lower casing sheet 12a. The pressure is selected depending on the desired mat density, depending on the applications. Furthermore, it can be followed by one or more compression rollers 62. Following this compression, the material core is an essentially monolithic, compact form, due in part to sintering of various fragments of material. The straightening guides 52 are followed by folding guides 54 which fold down the end of the straightened end of the lower sheet 12a on the top of the core of compressed materials, preferably before the upper casing sheet 12b is deposited. A thermofusion or heat-sealing device 70 assembles said sheets by forming a skin enclosing the compressed plastics materials that form the core of the mat of the invention. Downstream of the thermofusion device 70, a device for internal spot thermofusion 80 of thermofusible plastics materials of the core of the mat is arranged. Said device can in turn be followed by compression means 92, 94, 96 which make it possible to keep the shaped mat under compression while the thermofusion spots are cooled and/or solidified.

The thermofusion device 80 is mounted on jacks 82 which allow said device to be raised or lowered. It advantageously consists of a perforated base 84 and a support base 86 that is connected to the perforated base 84 by means of telescopic spacers 88, preferably jacks. The support base bears heated needles that are mounted essentially perpendicularly, in register with the openings of the perforated base.

It is furthermore possible to provide a second internal spot fusion device 80 under the work surface 50, in order to be able to act by means of one or the other or both of the devices simultaneously.

When the material, pre-compressed by the rollers 60 and/or 62, reaches the height of the internal spot thermofusion device, the longitudinal displacement of the bed of material is interrupted and the perforated base is lowered by means of the jacks 82, while compressing the bed of material which is thus compressed between the support surface 50, the perforated base 84, the lateral guides 56 and the compression means 58. It is possible, at present, to lower the support base 86 which comprises a plurality of heated needles 89 oriented towards the bed of material. Said heated needles thus sink into the bed of material, creating spot thermofusion in the core of the material. If the support surface 50 is also perforated, the needles can easily pass through the mat and the casing thereof.

The heated needles are brought to a working temperature greater than the softening temperature of at least some of the polymer fragments of the core of the mat. Said heated needles create channels through the mass of the mat which interconnect the various fragments or elements and/or rigidify and/or retain the shape of the mat. During retraction of the heated needles 89 by actuation of the jacks 88, said heated needles are cleaned by means of passing through and rubbing in the channels hollowed out by means of thermofusion.

It is, of course, possible to provide probes which determine the resistance encountered by the heated needles, and which make it possible to increase the temperature or to trigger either stopping the sinking of the needles or of the point or needles in question, in order to prevent destruction or premature wearing, in particular when a fragment of non-plastics material is encountered, such as wood or metal. It is also possible to provide for mechanical disengagement means which engages in the event of too high a resistance to the sinking.

The heated needles are advantageously equipped with suitable electrical resistors and a thermocouple at the penetrating end thereof in order to bring said end to the desired temperature and to monitor and control the temperature thereof in order to prevent overheating and premature wear.

The installation described above allows for continuous manufacture of mats described above. A lower thermoplastic sheet is deposited on the belt conveyor, the covering edges of said sheet are straightened from each side of the belt conveyor, on lateral walls, a mixture comprising fragments of thermoplastic materials is deposited and distributed on the lower thermoplastic sheet, an upper thermoplastic sheet is deposited on the bed of material, the bed of material is compressed to a desired density, internal spot thermofusion is carried out in the bed of material which is compressed by sinking in needles heated to a temperature greater than the softening point of at least one of the thermoplastic materials present, and the compression is maintained until cooling has taken place at least in part.

The heated needles can again be brought to the desired temperature in various ways that are essentially known per se. Thus, they may be brought into a heated atmosphere, such as a high-temperature liquid, a high-temperature gas, infrared radiation, or other radiation causing an increase in temperature in the mass of the point. In all cases it is advantageous to provide a thermocouple in order to allow for measurement, and thus control, of the temperature.

As a result, a mat as described above is obtained, which may be separated or cut into blocks of desired dimensions and used as described.

What is claimed is:

1. A method for manufacturing a rigid mat made of a mixture of thermoplastic materials, wherein the mat includes a core made of compacted plastic materials having a cohesion based on internal spot thermofusion, and a thermoplastic casing that is rigidly connected to the core by means of spot thermofusion, the method comprising:
    depositing a lower thermoplastic sheet on a belt conveyor;
    depositing and distributing a mixture comprising fragments of thermoplastic materials on the lower thermoplastic sheet;
    depositing an upper thermoplastic sheet on the mixture of thermoplastic materials;
    passing the mixture of thermoplastic materials under a press which compresses the mixture of thermoplastic materials to a desired density;
    penetrating heated needles into the compressed mixture of thermoplastic materials, at a temperature greater than a softening point of at least one of the thermoplastic materials present in the mixture, to perform internal spot thermofusion on the compressed mixture of thermoplastic materials and to rigidly connect the lower thermoplastic sheet and the upper thermoplastic sheet to the compressed mixture of thermoplastic materials as a thermoplastic casing; and
    cooling the mixture of thermoplastic materials.

2. The method of claim 1, further comprising unwinding the lower thermoplastic sheet on the belt conveyor and/or unwinding the upper thermoplastic sheet on the mixture of thermoplastic materials.

3. The method of claim 1, further comprising weighing and/or metering the materials and/or homogenizing the mixture prior to depositing and distributing the mixture comprising the fragments of the thermoplastic materials on the lower thermoplastic sheet.

4. The method of claim 1, further comprising compressing the mixture of thermoplastic materials at a temperature of between about 20° C. and about 30° C.

5. The method of claim 1, wherein the temperature of the heated needles is at least about 10° C. greater than a softening point of all thermofusible materials present in the mixture.

6. The method of claim 1, wherein the mat is configured for use in load distribution in the case of loose, unstable, or marshy ground, stabilization of embankments or unstable ground, earthquake-proof protection of structures, and/or forming absorbent ballast for railways.

7. The method of claim 1, wherein the mat is configured for use in manufacturing insulating panels.

8. The method of claim 1, further comprising:
including organic matter and/or nutrients in the core of the mat; and
wherein the mat is configured for use in growing plants and/or as a basis for arable ground.

* * * * *